United States Patent
Nagai et al.

[11] Patent Number: 5,768,634
[45] Date of Patent: Jun. 16, 1998

[54] HAND DEVIATION CORRECTION APPARATUS

[75] Inventors: Jun Nagai; Koichi Sato, both of Tokyo, Japan

[73] Assignee: Sony Corporation, Tokyo, Japan

[21] Appl. No.: 650,267

[22] Filed: May 22, 1996

[30] Foreign Application Priority Data

May 31, 1995 [JP] Japan .................. 7-134127

[51] Int. Cl.⁶ .................................. G03B 17/00
[52] U.S. Cl. .................................. 396/54
[58] Field of Search ............... 348/208; 396/53, 396/52–55

[56] References Cited

U.S. PATENT DOCUMENTS

| | | | |
|---|---|---|---|
| 5,107,293 | 4/1992 | Sekine et al. | 354/430 |
| 5,282,044 | 1/1994 | Misawa et al. | 358/222 |
| 5,376,993 | 12/1994 | Kubota et al. | 354/430 |
| 5,386,264 | 1/1995 | Sekine et al. | 354/431 |
| 5,561,498 | 10/1996 | Sekine et al. | 396/53 |
| 5,583,597 | 12/1996 | Enomoto | 396/55 |
| 5,587,737 | 12/1996 | Sekine et al. | 348/208 |
| 5,640,611 | 6/1997 | Kai et al. | 396/55 |

*Primary Examiner*—Safet Metjahic
*Assistant Examiner*—Christopher E. Mahoney
*Attorney, Agent, or Firm*—Jay H. Maioli

[57] ABSTRACT

An imaging apparatus includes a unit for detecting oscillations of an image attributable to oscillations of the imaging apparatus. Also included are a correction signal generating unit for generating a correction signal for correcting oscillations of the image based on detected oscillations, a correction unit for correcting oscillations of the image based on the correction signal, and a setting unit for setting characteristics of the correction signal responsive to the characteristics of the detected oscillations. Phase and gain compensation characteristics are adjusted in response to the frequency detected.

17 Claims, 4 Drawing Sheets

HAND DEVIATION CORRECTION APPARATUS

BACKGROUND OF THE INVENTION

1. Field of the Invention

This invention relates to an apparatus and method employed with advantage for, for example, a handy type video camera apparatus.

2. Description of the Related Art

Nowadays, a handy type video camera apparatus having a so-called CCD image sensor is in widespread use.

The handy type video camera apparatus is small-sized and lightweight. For this very reason, it has a drawback that it is susceptible to hand deviation during imaging. If such hand deviation occurs, fine "oscillations" are produced in a reproduced picture obtained on reproduction of a picture imaged with, for example, zoom-up, with the result that the reproduced picture becomes blurred and extremely ill-looking.

As means for compensating such oscillations caused by hand deviation to render the reproduced picture easy to view, there is known a technique of compensating hand deviation by a hand deviation correction device provided in the video camera apparatus. Among the correction means for correction hand deviation in the hand deviation correction device, there are such correction means employing a method of correcting the hand deviation by picture processing, or a method of correcting the hand deviation by optical processing.

Among the correction means for correcting hand deviation by picture processing, there are a memory control system and a CCD driving control system.

The memory control system is such a system in which, if hand deviation is detected, part of picture signals obtained on imaging an object is taken out as a picture frame, and a picture frame of the previous field and the picture frame of the current field are moved into registration with each other. The picture in the picture field portion is enlarged for procuring a range of correction. If this picture is enlarged, the reproduced picture is deteriorated in quality since the picture signals are enlarged by a factor incompatible with the resolution of a CCD image sensor. Such deterioration in picture quality becomes more conspicuous the wider the range of correction. Thus, with the present system, the picture quality is lowered, while the range of correction cannot be widened. However, the correction means employing this system is constructed solely by ICs and hence is suited for use with a small-sized inexpensive video camera apparatus.

With the above-described CCD driving control system, correction is realized by varying the timing of reading out video signals obtained on imaging an object from the CCD image sensor on detecting hand deviation. With this system, since the range of compensation is achieved by increasing the number of pixels of the CCD image sensor, it is necessary to increase the number of pixels for correcting hand deviation even in cases wherein "oscillations" appear to be enlarged as in the case of the object imaged with high magnification. However, if the number of pixels is increased for assuring sufficient correction of hand deviation caused by magnified "oscillations", the CCD image sensor and its peripheral circuit become bulky and not practically useful. With the correction means employing this system, a sufficient number of the pixels to correct the hand deviation corresponding to the magnified "oscillations" is not assured, so that a picture portion of the reproduced picture corresponding to the hand deviation associated with such magnified oscillations becomes discrete. However, hand deviation correction can be achieved without any inconvenience with the usual imaging multiplication. In addition, the system is made up only of ICs and hence is suited for use with a small-sized inexpensive video camera apparatus.

Among correction means for correcting hand deviation by optical processing, there are a gimbal camera system and an active camera system.

The gimbal camera system is such a system in which, if hand deviation is detected, the lens unit in its entirety is moved in a direction of canceling hand deviation for correcting hand deviation. With this system, resolution is not deteriorated, while a broader range of correction may be assured. However, since the lens unit is moved in its entirety, the mechanism becomes bulky, while power consumption is also increased. Consequently, the correction means employing this system is suited to such case in which it is desired to achieve high resolution even if the size is increased to.

The active prism system is such a system in which, on detection of hand deviation, only a part of the lens unit is moved in a direction of canceling hand deviation for correcting hand deviation. With this system, power consumption is small and the device may be easily reduced in size, while resolution is not deteriorated and a broader range of compensation may be achieved. If the hand deviation is prohibited with the present active prism system, there are produced no "oscillations" in the reproduced picture, so that a handy type video camera apparatus may be achieved which is small-sized and lightweight and which is capable of achieving high picture quality.

An active prism employed in the active prism system is produced by interconnecting two glass plates with an expandable bellows formed by a special film and by charging a liquid having substantially the same optical refractive index as that of the glass plates. The active prism is provided intermediate between the objective lens provided on the front side of the video camera unit for conducting the image of an object from the object to the video camera unit and the CCD image sensor in a lens unit for conducting an image of the object to a CCD image sensor from the objective lens. The hand deviation is corrected by varying the angles of inclination, referred to herein as apex angles, of the two glass plates in respective different longitudinal and transverse directions of the video camera unit.

These hand deviation correction means perform correction of hand deviation on detecting hand deviation. Among known oscillation amount detection means, there are a motion vector detection system and an angular velocity detection system.

The motion vector detection system detects the amount and the direction of the object movement by deriving the difference in video signals of the object of the current field and those of the previous field as stored in a semiconductor memory. This system has a drawback that mistaken operations tend to be produced during the time of low illumination. However, the oscillation amount detection means employing this system is made up only of ICs and hence is suited to a small-sized inexpensive video camera apparatus.

The angular velocity detection system is such a system in which the angular velocity is detected using an angular velocity sensor such as a piezo-electric oscillation gyro. Although a larger space is required than the ICs, due to use of mechanical components, the angular velocity may be detected on the real-time basis without mistaken operation caused by illumination conditions. Thus the hand deviation detection means, employing this system, is suited for use with a video camera apparatus designed for correcting hand deviation with high precision.

The hand deviation correction device, employed in the above-described handy type video camera apparatus, includes an oscillation amount detection unit for detecting hand deviation of a picture caused by oscillations of the video camera unit by a motion vector detection system or an angular velocity detection system, correction signal generating means for generating a correction signal based upon an output signal of the oscillation amount detection means, and correction means for correcting hand deviation based upon a correction signal generated by the correction signal generating means by a picture processing method of, for example, a memory control system or a CCD driving control system, or by an optical processing method of, for example, a gimbal mechanical system or an active prism system.

Meanwhile, the angle of the video camera apparatus is changed not only by hand deviation but also due to camera work, that is by panning (a technique of horizontally oscillating the camera during imaging) or by tilting (a technique of vertically moving the camera during imaging).

The camera work includes, in general, a slow camera work, so that frequency components not higher than 0.5 Hz are produced as a result of the camera work.

The frequency range of the camera work differs from user to user.

On the other hand, the frequency components of hand deviation in the case in which the user images from a stationary position without performing camera work, are 2 to 15 Hz. If the user images from a moving position, for example, from a moving car, the main frequency components of hand deviation are shifted to 20 to 25 Hz, that is towards the high frequency side. Also, the frequency range of the hand deviation differs from person to person.

With the above-described hand deviation correction device, hand deviation is corrected by performing servo control of canceling picture oscillations caused by hand deviation without correcting oscillations by the camera work in a frequency range of 2 to 30 Hz in order to take into account the hand deviation produced when the user performs camera work from a moving position. The reproduced picture by the video camera apparatus is then easy to view since the "oscillations" due to hand deviation are not produced.

With the above correction signal generating means, the frequency characteristics of the phase and the gain can be set variably. The frequency characteristics of the phase and the gain are set for optimally compensating the correction signals based on the frequency of the output signals of the oscillation amount detection means.

Figure 1:
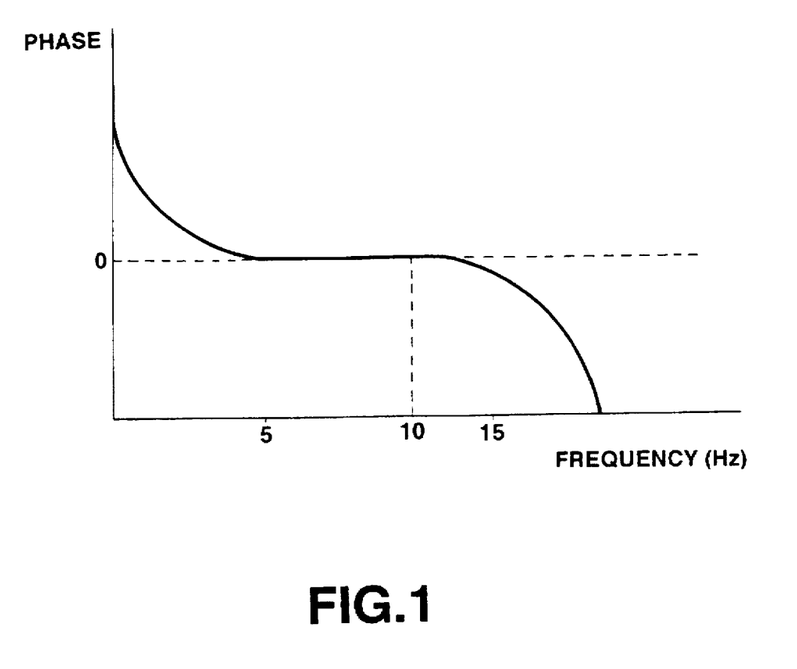
FIG. 1 is a graph showing frequency characteristics of phase compensation by a conventional hand deviation correction apparatus.

Thus it is possible with the hand deviation correction device to achieve the correction of hand deviation, on the basis of the compensated correction signal by the correction means With the above-described correction signal generating means, the output signal of the oscillation amount detection means is phase-delayed or phase-advanced for compensating lead and follow-up delay of the picture movement, respectively, if the output signal frequency is not more than 5 Hz or not less than 10 Hz, respectively, as shown in FIG. 1.

The correction signal generating means has a drawback that, if the user is imaging an object from a stationary position, since phase compensation is done at all times for each of the frequency of 5 Hz and the frequency of 15 Hz, correction of the hand deviation correction device becomes unnatural.

In addition, if the user is imaging from a car, since phase compensation is done at all times in the vicinity of the frequency of 15 Hz, correction of the hand deviation correction apparatus similarly becomes unnatural.

SUMMARY OF THE INVENTION

It is therefore an object of the present invention to provide a hand deviation correction apparatus whereby hand deviation correction may be performed spontaneously even during transient response time.

According to the present invention, there is provided an imaging apparatus including means for detecting oscillations of an image attributable to oscillations of the imaging apparatus, correction signal generating means for generating a correction signal for correcting oscillations of the image based on detected oscillations, correction means for correcting oscillations of the image based on the correction signal, and setting means for setting characteristics of the correction signal responsive to the characteristics of the detected oscillations.

According to the present invention, there is also provided a method for correcting for oscillations in an image including the steps of detecting oscillations of an image attributable to deflection of an imaging apparatus, generating a correction signal for correcting oscillations of the image based on detected oscillations, setting characteristics of the correction signal responsive to the characteristics of the detected oscillations, and correcting for oscillations of the image based on the correction signal the characteristics of which have been set.

BRIEF DESCRIPTION OF THE DRAWINGS

FIGS. 4A and 4B are graphs showing a typical signal supplied from the deviation amount detection means of the hand deviation correction device to the frequency detection means, where FIG. 4A shows characteristics on shooting from a stationary position and FIG. 4B shows characteristics on shooting from a moving car.

DESCRIPTION OF THE PREFERRED EMBODIMENTS

Referring to the drawings, certain preferred embodiments of the present invention will be explained in detail. The hand deviation correction device of the present invention is provided for correcting deviation by hand of, for example, a handy type video camera apparatus. The hand deviation correction device shown in FIG. 2 is an instance of a hand deviation correction device employing an angular velocity detection method as an oscillation amount detection method and also employing an active prism system as a correction method.

Figure 2:
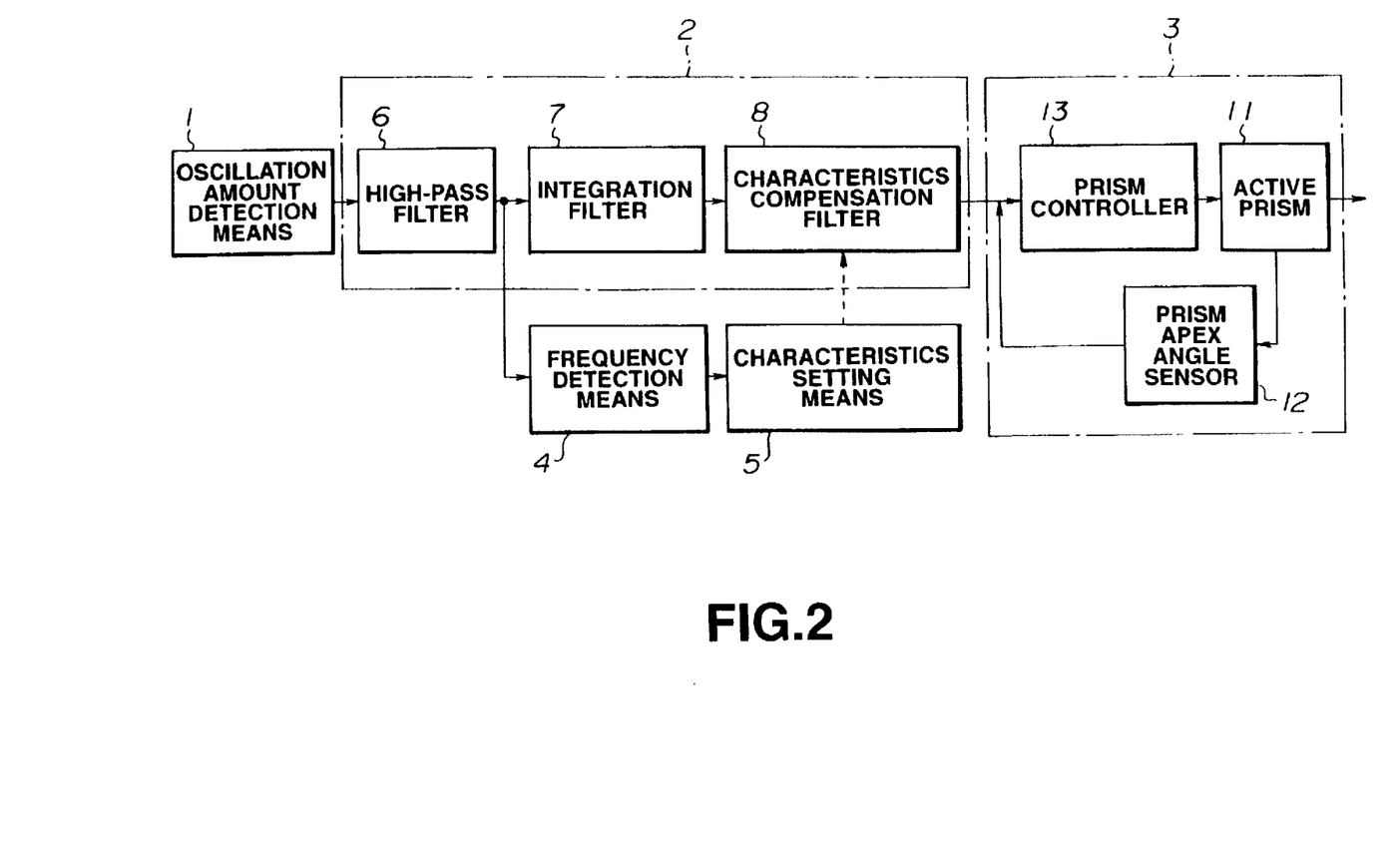
FIG. 2 is a schematic block diagram showing a hand deviation correction device according to the present invention.

The hand deviation correction device, shown in FIG. 2, provided in a handy type video camera apparatus, according to the present invention, includes an oscillation amount detection unit 1 for detecting the amount of picture oscillation caused by deflection of the video camera unit, and a correction signal generating unit 2 for generating a correction signal based upon an output signal of the oscillation amount detection unit 1. The hand deviation correction device also includes a correction unit 3 for correcting the picture oscillation based upon the correction signal, and a frequency detection unit 4 for detecting the frequency of the output signal of the oscillation amount detection unit 1. The hand deviation correction device further includes a characteristics setting unit 5 for setting characteristics of the correction signal generating unit 2 based upon a detection output of the frequency detection unit 4.

The oscillation amount detection unit 1, employing an angular velocity detection system comprised of a piezoelectric oscillation vibration gyro, includes a first angular velocity sensor and a second angular velocity sensor. These first and second angular velocity sensors are mounted with the detection surfaces thereof directed in the longitudinal and transverse directions of the video camera unit for detecting angular velocities in the yawing and pitching directions, respectively.

These first and second angular velocity sensors are positioned in the vicinity of an active prism 11 of the correction unit 3 as later explained for detecting the values of the angular velocity in the yawing and pitching directions of the active prism 11, respectively.

The oscillation amount detection unit 1, having the above construction, detects the values of the angular velocity caused by oscillations in the yawing and pitching directions of the video camera unit, using the first and second angular velocity sensors, and outputs the output signals to the correction signal generating unit 2.

The correction signal generating unit 2 includes a high-pass filter 6 for cutting low-frequency components of output signals of the first and second angular velocity sensors, outputted by the hand deviation amount detection unit 1, an integrating filter 7 for integrating the angular velocity signal outputted by the high-pass filter 6 to generate an angular signal, and a characteristics compensation filter 8 for compensating the angular signal. The filter 8 has its gain and phase variably set for variably setting the pass-band mid point for the angular signal.

The high-pass filter 6 is comprised of an active filter, such as a three-order active filter, for cutting noise components of low-frequency components of unneeded bands such as resonant frequencies of a measurement system used for measuring output signals of the first and second angular velocity sensors.

The high-pass filter 6 cuts low-frequency noise components so that the angular velocity signals may be discriminated from the above output signal. The angular velocity signal, thus discriminated, is sent to the integrating filter 7.

The integrating filter 7 includes a sampling A/D converter for sampling the angular velocity signal, discriminated by the high-pass filter 6, with a sampling frequency sufficiently higher than the pass-band mid point of the compensation filter 8 and for A/D converting the sampled angular velocity signal, and a microcomputer computer for calculating the sum of the sampled angular velocity signal and the sampling time of sampling of the angular velocity signal.

The integrating filter 7 integrates the sum of the products of the angular velocity signal sent from the high-pass filter 6 and the sampling time for producing angular signals of the oscillations in the yawing and pitching directions caused by the deflection of the video camera unit. The angular signals in the yawing and pitching directions are sent to the characteristics compensation filter 8.

The characteristics compensation filter 8 is a band-pass filter comprised of a digital filter. The transfer function $\theta_0$ of the characteristics compensation filter 8 is represented by the equation (1):

$$\theta_0 = K_3 * \frac{1 - k_2 * Z^{-1}}{1 - K_1 * Z^{-1}} \qquad (1)$$

where $K_1$, $K_2$ denote values of phase compensation by transmission from the output side of the first and second angular velocity sensors of the oscillation amount detection unit 1 to the output side of the characteristics compensation filter 8 of the correction signal generating unit 2, $Z^{-1}$ denotes an operator for phase delay and $K_3$ denotes a compensation value of the gain of the characteristics compensation filter 8.

Figure 3:
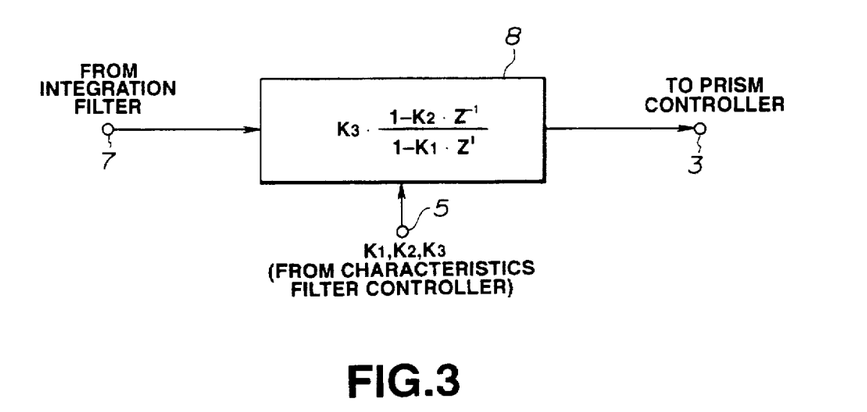
FIG. 3 schematically shows variable setting of compensation characteristics of a characteristics compensation filter provided in correction signal generating means constituting the hand deviation correction device.

With the characteristics compensation filter 8, the compensation values $K_1$, $K_2$ and $K_3$ may be variably set by the characteristics setting unit 5 based upon a detection output of the frequency detection unit 4. If the compensation values $K_1$, $K_2$ and $K_3$ are changed, the frequency characteristics of the transfer function $\theta_0$ are changed, as apparent from the equation (1). Thus the pass-band mid point frequency of the angular signal entering the characteristics compensation filter 8 and hence the frequency characteristics of the correction signal outputted by the characteristics compensation filter 8 are changed.

The frequency characteristics of the correction signal can be varied by the characteristics compensation filter 8 via characteristics setting unit 5.

With the above-described correction signal generating unit 2, the output signals of the first and second angular velocity sensors, transmitted by the hand deviation amount detection unit 1, are filtered by the high-pass filter 6 to give angular velocity signals free of noise. These angular velocity signals are integrated by the integrating filter 7 to give angular signals, which are passed through the characteristics compensation filter 8 to give correction signals. With the correction signal generating unit 2, the compensation values $K_1$, $K_2$ and $K_3$ of the characteristics compensation filter 8 are variably set for variably setting the phase compensation characteristics and the frequency characteristics of the gain of the correction signals generated by the characteristics compensation filter 8. These correction signals are supplied from the correction signal generating unit 2 to the correction unit 3.

The correction unit 3, employing the active prism system, includes the active prism 11, a prism apex angle sensor 12 for detecting an apex angle signal of the active prism 11 and a prism controller 13 for variably driving the apex angle of the active prism 11.

The active prism 11 is comprised of two expandable glass plates formed by special films and a liquid having substantially the same optical refractive index as that of the two glass plates. These two glass plates is mounted so that the apex angles thereof may be variably set with resect to the longitudinal and transverse directions of the video camera unit.

This active prism 11 is mounted in the lens unit on the front side of an imaging unit of a CCD image sensor on which an image of an object is imaged via an objective lens.

By varying the apex angles of the glass plates of the active prism 11 in a direction of canceling hand deviation, hand deviation may be canceled so that the image of the object imaged on the CCD image sensor is freed of the "oscillations" otherwise caused by hand deviation.

The prism apex angle sensor 12 includes first and second arms, arranged upright on both lateral sides of the two glass plates of the active prism 11 parallel to the longitudinal and transverse directions of the video camera unit, and first and second photosensors for detecting the apex angles of the first and second arms in the yawing and pitching directions.

The apex angles of the glass plates of the active prism 11 are measured by the prism apex angle sensor 12.

The prism controller 13 includes first and second driving coils respectively engaged with the first and second arms set upright on the lateral sides of the glass plates for moving the two glass plates of the active prism 11 in the yawing and pitching directions, and a driving control unit for controlling the driving voltage of the first and second driving coils based upon the result of comparison of the output signals of the first and second photosensors of the prism apex angle sensor 12 to the correction signal sent from the correction signal generating unit 2.

The prism controller 13 controls the driving voltage of the first and second driving coils by a driving controller so that the correction signal generated by the correction signal generating unit 2 based upon the angular signal produced by hand deviation of the video camera unit in the yawing and pitching directions, as sensed by the first and second angular velocity sensors, are compared by a comparator with the apex angles in the yawing and pitching directions of the two glass plates of the active prism 11 as sensed by the first and second photosensors, for driving the apex angles of the two glass plates in a direction of canceling the hand deviation.

Thus it is possible with the prism controller 13 to drive the apex angles of the two glass plates of the active prism 11 in a direction of canceling the hand deviation.

With the above-described correction unit 3, the correction signals from the characteristics compensation filter 8 of the correction signal generating unit 2 are supplied to the prism controller 13. The apex angles of the two glass plates of the active prism 11 are detected by the prism apex angle sensors 12 to produce apex angle signals which are entered to the prism controller 13. The prism controller 13, thus fed with the correction signals and the apex angle signals, varies the apex angles of the two glass plates in the direction of canceling the hand deviation for correcting the hand deviation.

The frequency detection unit 4 detects the frequency by counting the zero angular velocity points, as sensed by the oscillation amount detection unit 1, on the time axis every unit time duration.

Figure 4A:
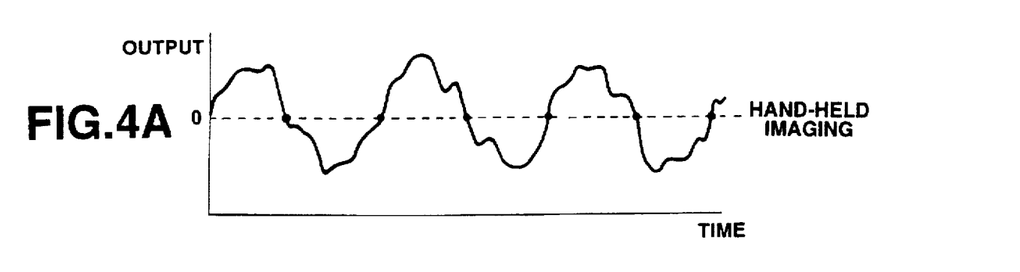

If the user shoots from a still position using the video camera apparatus, an angular velocity signal, comprised of a component of low frequency (2 to 5 Hz) and large amplitude superimposed on a component of high frequency (0 to 15 Hz) and small amplitude, as shown in FIG. 4A, is supplied from the oscillation amount detection unit 1 to the frequency detection unit 4, which then counts the zero amplitude points of the angular velocity signal on the time axis every unit time duration.

Figure 4B:
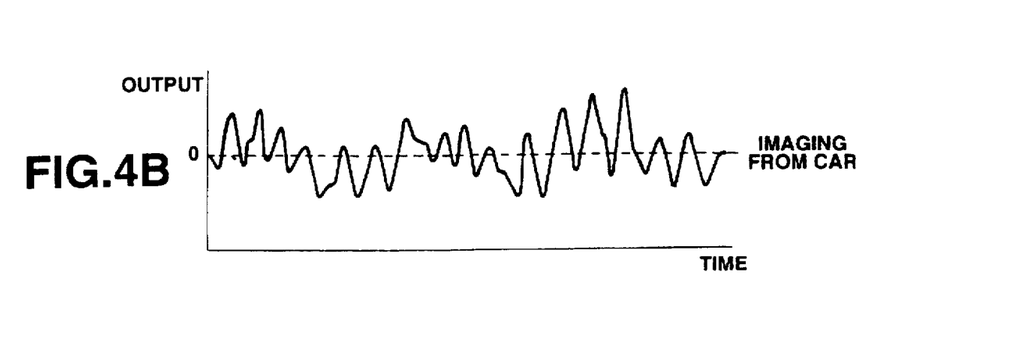

If the user shoots from a car using the video camera apparatus, an angular velocity signal, comprised of a component of low frequency (2 to 5 Hz) and small amplitude superimposed on a component of high frequency (20 to 25 Hz) and large amplitude as shown in FIG. 4B, is supplied from the oscillation amount detection unit 1 to the frequency detection unit 4, which then counts the zero amplitude points of the angular velocity signal on the time axis every unit time duration.

Figure 5A:
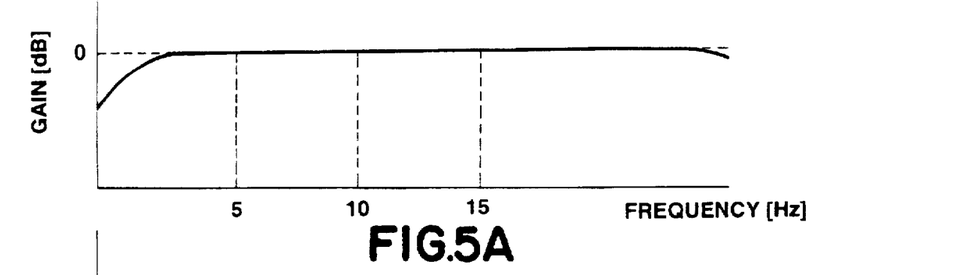
FIG. 5 is a graph showing frequency characteristics of phase compensation by the characteristics compensation filter.
Figure 5B:
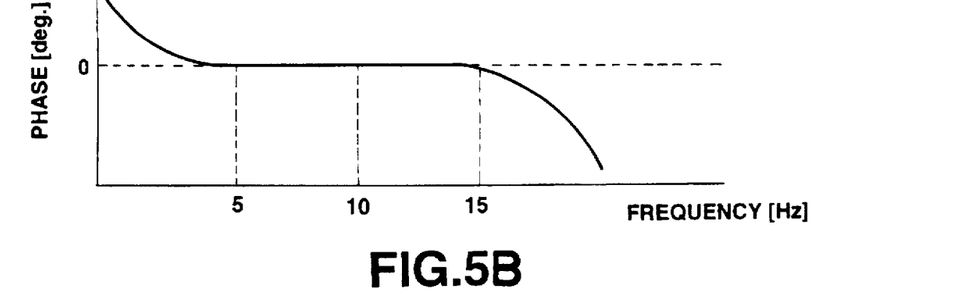

If the user shoots from a stationary position, using the video camera apparatus, that is if the frequency of the angular velocity signals as detected by the frequency detection unit 4 is 2 to 15 Hz, the characteristics compensation filter 8 of the correction signal generating unit 2 is set by the characteristics setting unit 5 so that the phase to frequency characteristics will be as shown in FIG. 5. That is, if the frequency is 5 to 15 Hz, the compensation values $K_1$ and $K_2$ are set to zero, while the compensation value $K_3$ is set to 1.

In this case, the characteristics of the compensation filter 8 are not changed with the frequency of the detected angular velocity signal. The reason is that, if the characteristics of the compensation filter 8 are changed each time the frequency is changed, the resulting picture looks unnatural.

If the user shoots from a car using the video camera apparatus, that is if the frequency of the angular velocity signal as detected by the frequency detection unit 4 is 20 to 25 Hz, the compensation filter 8 of the correction signal generating unit 2 is set by the characteristics setting unit 5 so that the characteristics will be as shown in FIG. 5. That is, if the detected frequency is 20 Hz, the compensation values $K_1$, $K_2$ and $K_3$ are selected so that the phase delay will become zero in the vicinity of 20 Hz as shown in characteristics (a) in FIG. 6. If the detected frequency is 22 Hz, the compensation values $K_1$, $K_2$ and $K_3$ are selected so that the phase delay will become zero in the vicinity of 22 Hz, as shown in characteristics (b) in FIG. 6. If the detected frequency is 25 Hz, the compensation values $K_1$, $K_2$ and $K_3$ are selected so that the phase delay will become zero in the vicinity of 25 Hz, as shown in characteristics (c) in FIG. 6.

Figure 6A:
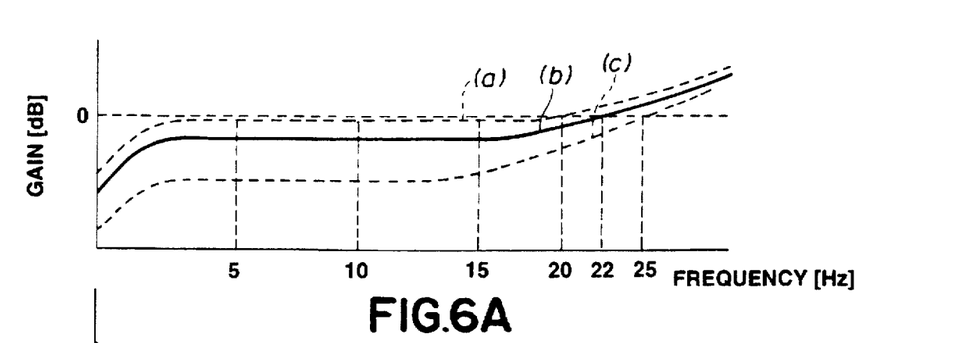
FIG. 6 is a graph similar to FIG. 5 for illustrative phase compensation by the conventional hand deviation correction device.
Figure 6B:
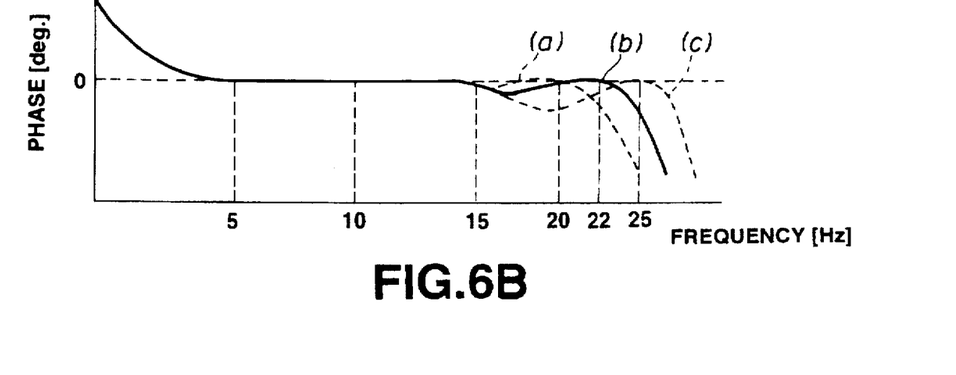

In this manner, the phase to frequency characteristics of the characteristics compensation filter 8 are changed with the frequency of the detected angular velocity signals. This effectively compensates for phase delay without relying upon the frequency of video camera oscillations.

If main components of the detected frequency are changed severely, the characteristics of the compensation filter 8 are changed each time the main components are changed, thus resulting in an unnatural looking image. However, in the high frequency range, the effect ascribable to phase delay is more outstanding than the effect ascribable to changes in the characteristics of the compensation filter 8. Thus the characteristics of the compensation filter 8 are changed responsive to the frequency of the detected angular velocity signals.

The hand deviation correction device according to the instant embodiment employs an angular velocity detection system and an active prism system as the oscillation quantity detection method and as the correction method, respectively. The present invention, however, is not limited to this embodiment. With the use of the hand deviation correction device according to the present invention, a small-sized and lightweight handy type video camera apparatus may be realized in which, when hand deviation is detected by a detection method such as motion vector detection method or the angular velocity detection method, such hand deviation is corrected by a correction unit by a picture processing method such as memory control method or CCD driving control method or an optical processing method such as gimbal mechanical system or an active prism system, so that no "oscillations" due to hand deviation or wobbling may be produced in the reproduced picture.

With the above-described hand deviation correction device of the present invention, the frequency of the output signal of an oscillation amount detection unit is detected by the frequency detection unit. The compensation characteristics of the correction signal generating unit are variably set responsive to the detection output of the frequency detection unit.

Thus, when a user is shooting from a car, the compensation characteristics of the correction signal generating unit is optimized responsive to the frequency of the output signal for spontaneously correcting hand deviation irrespective of changes in imaging environments. In addition, if the user is image from a stationary position, the unnatural character of an image, which may be produced each time compensation characteristics are changed, may be resolved by fixing the compensation characteristics of the correction signal generating means.

What is claimed is:

1. An imaging apparatus comprising:
   means for detecting oscillations of, an image attributable to oscillations of the imaging apparatus;
   correction signal generating means for generating a correction signal for correcting oscillations of the image based on oscillations detected by said means for detecting;
   correction means for correcting oscillations of the image based on said correction signal generated by said correction signal generating means; and
   setting means for setting characteristics of said correction signal responsive to characteristics of oscillations detected by said means for detecting oscillations;
   wherein said correction signal generating means includes a high-pass filter with a predetermined pass-band having a predetermined low-frequency cutoff and a transfer function dependent on values of phase and gain compensation; and
   wherein said setting means includes:
      frequency detection means for detecting a frequency of the oscillations detected by said, means for detecting; and
      characteristics setting means for adjusting said values of phase and gain compensation, thereby setting characteristics of said correction signal responsive to the frequency detected by said frequency detection means;
      said characteristics setting means being adapted to set characteristics of said correction signal such that when the oscillations of the imaging apparatus are less than said predetermined low-frequency cutoff the oscillations of the image are not changed.

2. The imaging apparatus as claimed in claim 1 wherein said correction signal compensates phase characteristics of the image.

3. The imaging apparatus as claimed in claim 2 wherein said characteristics setting means sets frequency characteristics of said correction signal responsive to the frequency detected by said frequency detection means.

4. The imaging apparatus as claimed in claim 3 wherein, on detection of high frequency oscillation components by said means for detecting, said setting means sets frequency characteristics of said correction signal corresponding to the high frequency oscillation components.

5. The imaging apparatus as claimed in claim 3 wherein said setting means is responsive to oscillation components corresponding to images obtained from a car to set said frequency characteristics of the corresponding correction signal.

6. The imaging apparatus as claimed in claim 5 wherein said setting means does not change frequency characteristics of the correction signal for oscillation components corresponding to images obtained from a stationary object.

7. The imaging apparatus as claimed in claim 3 wherein said correction means includes an active prism.

8. The imaging apparatus as claimed in claim 3 wherein said means for detecting includes an angular velocity sensor.

9. An imaging apparatus comprising:
   means for detecting oscillations of an image attributable to oscillations of the imaging apparatus;
   correction signal generating means for generating a correction signal for correcting oscillations of the image based on oscillations detected by said means for detecting;
   correction means for correcting oscillations of the image based on said correction signal generated by said correction signal generating means; and
   setting means for setting characteristics of said correction signal responsive to characteristics of oscillations detected by said means for detecting oscillations;
   wherein said correction signal generating means includes a high-pass filter with a predetermined pass-band having a predetermined low-frequency cutoff; and
   wherein said setting means includes:
      frequency detection means for detecting a frequency of the oscillations detected by said means for detecting; and
      characteristics setting means for setting characteristics of said correction signal responsive to the frequency detected by said frequency detection means;
      said characteristics setting means being adapted to set characteristics of said correction signal such that when the oscillations of the imaging apparatus are less than said predetermined low-frequency cutoff the oscillations of the image are not changed;
      wherein said correction signal compensates phase characteristics of the image;
      wherein said characteristics setting means sets frequency characteristics of said correction signal responsive to the frequency detected by said frequency detection means; and
      wherein said setting means is responsive to oscillation components of a frequency not lower than 20 Hz to set frequency characteristics of the corresponding correction signal.

10. The imaging apparatus as claimed in claim 9 wherein said setting means does not change frequency characteristics of the correction signal for oscillation components within the range of 2 to 20 Hz.

11. A method for correcting for oscillations in an image comprising the steps of:
   detecting oscillations of the image attributable to deflection of an imaging apparatus;
   generating a correction signal for correcting oscillations of the image based on the detected oscillations of the image;
   setting characteristics of said correction signal responsive to characteristics of the detected oscillations of the image; and
   correcting for oscillations of the image based on the correction signal, the characteristics of said correction signal having been set;
   wherein said correction signal generating step includes high-pass filtering the detected oscillations of the image using a high-pass filter with a predetermined pass-band having a predetermined low-frequency cutoff and a transfer function dependent on values of phase and gain compensation; and wherein said setting characteristics step includes:

detecting a frequency of the detected oscillations of the image; and adjusting said values of phase and gain compensation, thereby setting characteristics of the correction signal responsive to the frequency detected;

wherein frequency characteristics of said correction signal are set such that when the oscillations of the imaging apparatus are less than said predetermined low-frequency cutoff the oscillations of the image are not changed.

12. The method for correcting for oscillations in an image as claimed in claim 11 wherein said correction signal compensates phase characteristics of the image.

13. The method for correcting for oscillations in an image as claimed in claim 12 wherein said setting characteristics step sets said frequency characteristics of the correction signal corresponding to high frequency oscillation components.

14. The method for correcting for oscillation in an image as claimed in claim 12 wherein said frequency characteristics of the correction signal are set responsive to oscillation components corresponding to images obtained from a car.

15. The method for correcting for oscillations in an image as claimed in claim 14 wherein said setting characteristics step does not change said frequency characteristics of the correction signal for said oscillation components corresponding to images obtained from a stationary object.

16. A method for correcting for oscillations in an image comprising the steps of:

detecting oscillations of the image attributable to deflection of an imaging apparatus;

generating a correction signal for correcting oscillations of the image based on the detected oscillations of the image;

setting characteristics of said correction signal responsive to characteristics of the detected oscillations of the image; and correcting for oscillations of the image based on the correction signal, the characteristics of said correction signal having been set;

wherein said correction signal compensates phase characteristics of the image; and wherein frequency characteristics of the correction signal are set responsive to oscillation components not lower than 20 Hz.

17. The method for correcting for oscillations in an image as claimed in claim 16 wherein said setting characteristics step does not change said frequency characteristics of the correction signal for said oscillation components of 2 to 20 Hz.

* * * * *